United States Patent [19]

Butler et al.

[11] Patent Number: 5,134,780
[45] Date of Patent: Aug. 4, 1992

[54] INCLINOMETER WITH RAIL HAVING A HOLLOW I-SHAPED CROSS-SECTION

[75] Inventors: Andrew G. Butler, Palo Alto; Edwin A. Seipp, III, Menlo Park, both of Calif.; Kevin J. Reeder, Columbus, Ohio; Blake R. Wharton, Menlo Park, Calif.; Brian J. Bayley, Palo Alto, Calif.; Jay Wilson, Portola Valley, Calif.

[73] Assignee: Wedge Innovations, Inc., San Jose, Calif.

[21] Appl. No.: 702,745

[22] Filed: May 20, 1991

[51] Int. Cl.⁵ .................................................. G01C 9/00
[52] U.S. Cl. ........................................... 33/366; 33/379
[58] Field of Search .................. 33/366, 379, 381, 382, 33/383, 451, 390, 365, 348, 348.2, 493, 483, 293, 295, 296; 52/729, 731

[56] References Cited

U.S. PATENT DOCUMENTS

| Re. 32,962 | 6/1989 | Tudek . | |
|---|---|---|---|
| D. 283,515 | 4/1986 | Li . | |
| D. 284,199 | 6/1986 | Li . | |
| D. 285,094 | 8/1986 | Li . | |
| D. 308,644 | 6/1990 | Butler et al. . | |
| 825,934 | 7/1906 | Pierson . | |
| 1,463,375 | 7/1923 | Shields . | |
| 1,691,776 | 11/1928 | Mayes | 33/381 |
| 2,633,640 | 4/1953 | Bucsko . | |
| 3,310,878 | 3/1967 | Giba . | |
| 3,861,052 | 1/1975 | Siegfried . | |
| 4,381,607 | 5/1983 | Place . | |
| 4,574,491 | 3/1986 | Vining . | |
| 4,625,423 | 12/1986 | Sackett . | |
| 4,648,185 | 3/1987 | Brandimarte . | |
| 4,716,534 | 12/1987 | Baucom et al. . | |
| 4,805,315 | 2/1989 | Nesbitt . | |
| 4,839,833 | 6/1989 | Parhiskari . | |
| 4,912,662 | 3/1990 | Butler et al. | 33/377 X |
| 4,972,603 | 11/1990 | Meyer | 33/811 X |

FOREIGN PATENT DOCUMENTS

| 969880 | 5/1950 | France | 33/384 |
|---|---|---|---|
| 249657 | 5/1948 | Switzerland | 33/296 |
| 357110 | 3/1930 | United Kingdom | 52/729 |

OTHER PUBLICATIONS

Photograph of STABILA Box I-Beam Levels with cap end removed and pages from a STABILA catalog showing box levels.
Picture of Tajima level with the end cap removed.

Primary Examiner—Harry N. Haroian
Attorney, Agent, or Firm—Fliesler, Dubb, Meyer & Lovejoy

[57] ABSTRACT

An inclinometer 20 includes a module 22 which is mounted to a rail 32. The rail 32 has a hollow I-shaped cross-section which affords substantial resistance to torsional and bending loads about the longitudinal axis 34 of the inclinometer 20. The rail 32 and in particular a first end 36 of the I-shaped cross-section includes first and second curves 48, 50 which define lobes which provide a rail design more suitable for gripping and placement by the user.

9 Claims, 2 Drawing Sheets

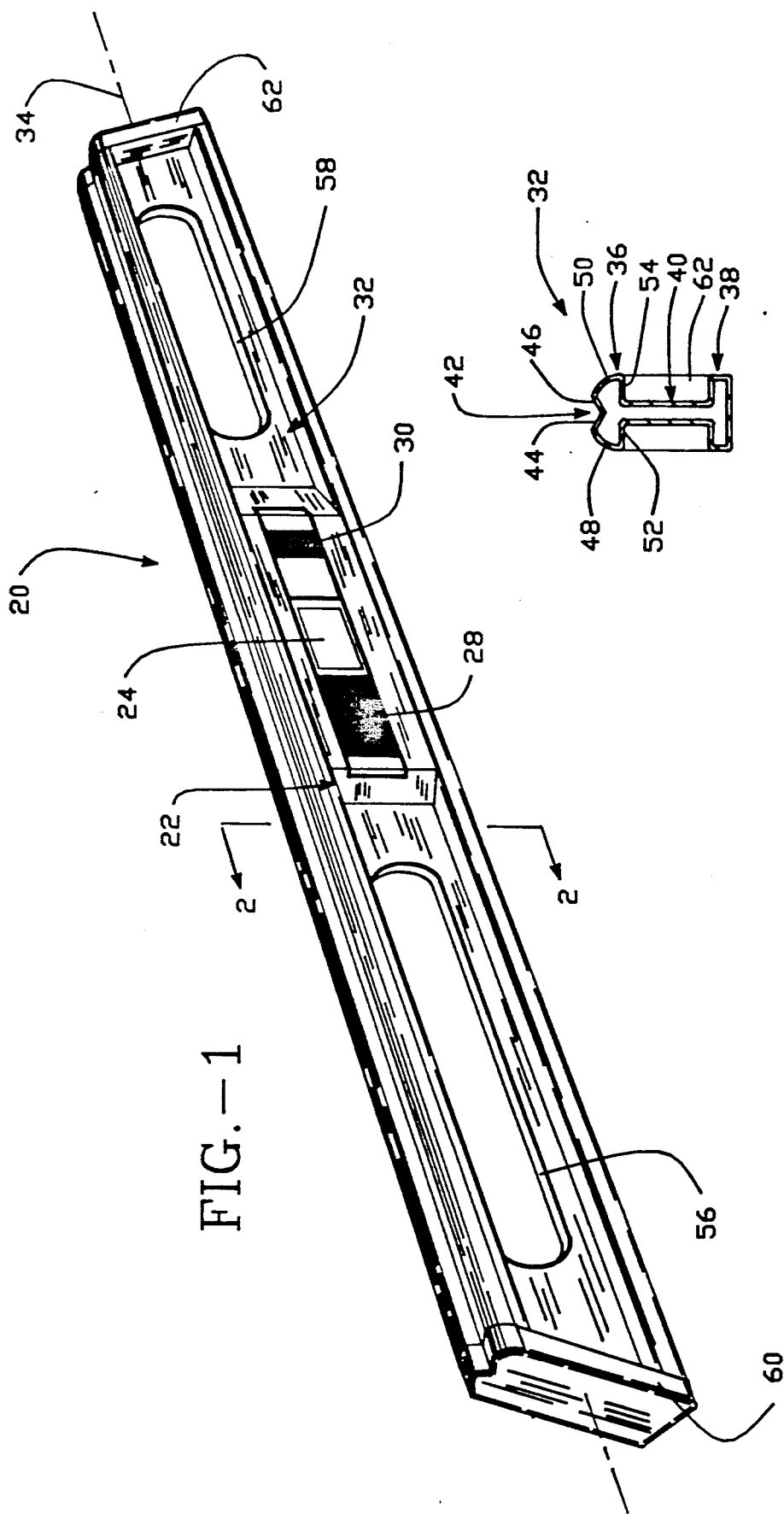

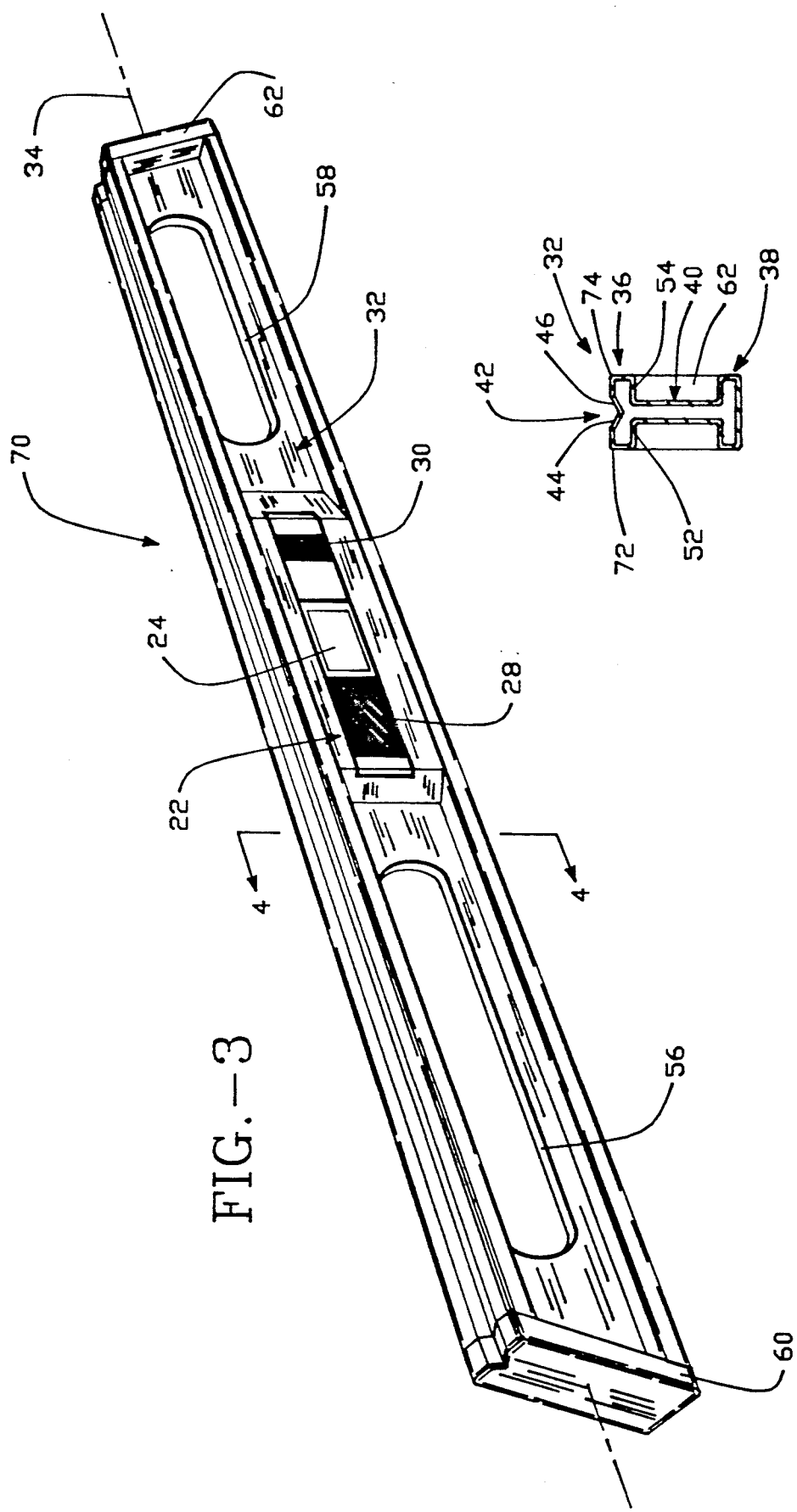

INCLINOMETER WITH RAIL HAVING A HOLLOW I-SHAPED CROSS-SECTION

FIELD OF THE INVENTION

The present invention is directed to an inclinometer having a rail.

BACKGROUND OF THE INVENTION

Inclinometers, and in particular inclinometers such as carpenter's levels which are used on construction sites need to be designed so that they can stand up to hard use. In the past, such carpenter's levels have been made from, for example, aluminum extruded I-beams, with a bubble sensor appropriately mounted onto the I-beam. Such I-beams cannot effectively resist torsional and bending loads which occur about the longitudinal axis of the level. Thus, the measuring device, such as the bubble sensor, is exposed to such torsional and bending loads. These torsional and bending loads can cause misalignment of the measuring device with respect to the rest of the I-beam rail and also can cause damage to the measuring device itself.

A more rigid level can be fashioned with a rail having either a solid rectangular cross-section or a hollow rectangular cross-section made by, for example, an extrusion process. These rails are known as box rails. They more effectively protect the sensing mechanism and also resist torsional and bending forces which can be placed on the sensing mechanism. Such box levels however are awkward and inconvenient to handle and hold in position. Thus, there exists a task of designing a ruggedized rail appropriate for a construction site or other such environment.

One solution to this task is disclosed in U.S. Pat. No. 4,912,662 entitled "Inclinometer" and issued on Mar. 27, 1990 and assigned to Wedge Innovations, Inc., the present assignee. The design of this inclinometer has a substantially wedge-shaped cross-section which is convenient for the user to hold. Additionally, the inclinometer disclosed in this patent is comprised of an I-beam cross-section with inserts to provide full torsional rigidity about the longitudinal axis of the inclinometer.

SUMMARY OF THE INVENTION

The present invention is directed to improving upon the prior art and providing alternatives to the design of U.S. Pat. No. 4,912,662.

The present invention is directed to an inclinometer which includes a means for sensing and displaying an orientation with respect to a reference and also a rail means for providing a mount for the sensing and displaying means and for positioning the sensing and displaying means with respect to an orientation. The rail means including a rail with a hollow I-shaped cross-section.

The invention further includes a rail that in cross-section has first and second ends which are substantially rectangular. The rail includes an interconnector which is connected to both the first and the second ends in such a manner so that the first end is spaced from and substantially parallel to the second end.

In another aspect of the invention, the first end of the inclinometer has a V-shaped groove with first and second sides. The first end further includes first and second curves extending respectively from the first and second sides of the V-shaped groove in the direction of the interconnector. The first and second curves on the first end of the rail conform to the hand of a user and thus allow the rail to be conveniently picked up and positioned. Further, the V-shaped groove allows the rail to be positioned relative to a cylindrical object such as, for example, a pipe.

In another aspect of the invention, the hollow I-shaped cross-section is comprised of an extrusion.

Thus, it can be seen that the rail of the present invention is configured so as to ruggedize the inclinometer and withstand substantial torsional and bending loading about the longitudinal axis of the rail. This ruggedization protects the sensing and displaying device secured to the rail and prevents any change of alignment or registration of the sensing and displaying device with respect to the rail. Such a device is highly advantageous for use on, for example, a construction site.

BRIEF DESCRIPTION OF THE FIGURES

FIG. 1 depicts a perspective view of a first embodiment of the invention;

FIG. 2 depicts a cross-sectional view through section 2—2 of FIG. 1;

FIG. 3 depicts a perspective view of a second embodiment of the present invention; and FIG. 4 depicts a cross-sectional view through FIG. 3.

DETAILED DESCRIPTION OF THE PREFERRED EMBODIMENT

With reference to the figures and in particular to FIG. 1, a first embodiment of the inclinometer 20 of the invention is depicted. Inclinometer 20 is comprised of a module 22 which includes a sensor and a circuit which are similar in design and function to the sensor and circuit described in U.S. Pat. No. 4,912,622 which is incorporated herein by reference. The sensor is for sensing an orientation of the inclinometer with respect to a reference. The circuit is for communicating a signal from the sensor and for determining the orientation sensed by the sensor. The module 22 further includes a display 24 which displays the orientation determined by the circuit. The module 22 includes an on/off button 28 and a reset button 30. Both of these buttons function in accordance with similar buttons which are disclosed in the above-referenced patent.

The module 22 is mounted in a rail 32, which in a preferred embodiment is comprised of an aluminum extrusion. It is to be understood that other fabrication techniques can be used to fashion the rail 32. As can be seen in FIG. 2 which depicts the cross-section of the rail 32, the rail 32 is of an innovative design which includes a hollow I-shaped cross-section which provides structural integrity and resists torsional and bending loading about the longitudinal axis 34 of the rail 32.

As can be seen in FIG. 2, the rail 32 includes first and second ends 36 and 38 with an interconnector 40 which joins to both first end 36 and second end 38. In a preferred embodiment, the interconnector 40 is substantially perpendicular to the first end 36 and the second end 38.

The first end 36 defines a V-shaped groove 42 which has first and second sides 44 and 46. The V-shaped groove 42 runs substantially parallel to the longitudinal axis 34. Extending from the first side 44 of the V-shaped groove 42 is a first curve 48. Extending from the second side 46 of the V-shaped groove 48 is a second curve 50. These curves extend away from the V-shaped groove 42 and towards the interconnector 40. First and second curves 48 and 50 meet with third and fourth sides 52, 54, which sides 52, 54 join to the interconnector 40 in an perpendicular manner. The V-shaped groove 42 provides a base for allowing the inclinometer 20 be positioned stably with respect to a cylindrical object such as, for example, a pipe. The V-shaped groove 42 and first and second curves 48, 50 define lobes which allow the rail 32 to be more conveniently held in the hand of a user. Generally, a user Will hold the rail by placing his hand or hands over the lobes and through the elongated ports 56, 58 defined through the interconnector 40 of the rail 32 on either side of the module 22.

Again as can be seen in FIG. 2, the interconnector 40 and the second end 38 are comprised of sustantially rectangular hollow forms having substantially parallel and spaced-apart sides. This configuration, in conjunction with the first end, provides for a lightweight rail which is rugged and which can withstand deformation in order to protect the module 22 and also to protect the alignment of the module 22 with respect to the rail 32 itself. Thus, this configuration of the rail 32 provides for a highly rigid structure which resists torsion and bending loading about the longitudinal axis 34, which loading can have a tendency of warping or springing the rail and effecting the positioning of the module 22 with respect to the rail 32. A misalignment of the module 22 with respect to the rail would provide an inclination reading which has a permanent off-set error with respect to any orientation which is to be determined.

The rail 32 further includes end cap 60, 62 which are beneficial in closing the ends of the rail should the rail be constructed by, for example, an extrusion process.

An alternative embodiment of the inclinometer is shown in FIGS. 3 and 4 and identified by the numeral 70. Elements of this inclinometer 70 which are similar to those of FIGS. 1 and 2 are identified by the same numerals as used in FIG. 1. In FIGS. 3 and 4, the rail 32, and in particular, the first end 36 thereof has a modified configuration which includes the V-shaped groove 42 with first and second sides 44, 46. Extending from the first and second sides 44, 46 are corners 72, 74. These corners extend toward the interconnector 40 and are joined to third and fourth sides 52, 54 which are substantially perpendicular to the interconnector 40. Thus, the first end, with the exception of the V-groove, is substantially rectangular. This configuration of the rail 32 gives all the same structural integrity advantages as described above with respect to the rail depicted in FIG. 2.

Industrial Applicability

The inclinometer 20 of the invention provides for a ruggedized module 22 and rail 32 arrangement which can withstand the work environment on a construction site. The rail 32 is lightweight and ergonomically designed for easy gripping. Further, the rail resists torsional and bending loading in order to protect the module 22 and maintain the position of the module 22 with respect to the rail 32. Thus, no off-set errors are introduced in any orientation determination caused by a misalignment of the module with respect to the rail due to such torsional loading.

It is also to be understood that the rail 32 of the present invention can be used as a torsional load resisting member with instrumentation and devices other than the module 22 which needs to be protected from such loading. In addition, such torsional load resisting members can be used by itself without any instrumentation or ports such as port 56, 58 where it is necessary to ensure that the members can resist such loading and maintain its shape and position.

Accordingly, it can be seen that the present inclinometer 20 has significant advantages with respect to the ease of construction, ease of use, accuracy and reliability. In addition to these advantages, aspects and objects of the invention as described hereinabove and in particular in the Summary of the Invention, other objects, aspects and advantages of the invention can be obtained through a view of the claims and the figures appended hereto. It is to be understood that although particular embodiments are presented herein, a multitude of other embodiments are possible and are within the scope of the invention as claimed.

We claim:

1. An inclinometer comprising:
a sensor means for sensing an orientation with respect to a reference;
a circuit means for communicating with the sensor means and for determining the orientation sensed by the sensing means;
a display means for communication with the circuit means and for displaying a visual representation of the orientation determined by the circuit means; and
rail means for providing a mount for the sensor means, and for positioning the sensor means when an orientation is to be sensed, said rail means including a rail with a hollow I-shaped cross-section; and wherein
said rail has first and second ends and an interconnector which is connected to both the first end and the second end in such a manner that the first end is spaced from the second end; and
said first end has defined therein a V-groove with first and second sides, said first end having first and second curves extending respectively from the first and second sides, toward the direction of the interconnector.

2. The inclinometer of claim 1 wherein:
said V-groove is located opposite to the interconnector and said first and second curves meet with third and fourth sides of the first end, which third and fourth sides also meet the interconnector.

3. An inclinometer comprising:
means for sensing and displaying an orientation with respect to a reference;
rail means for providing a mount for the sensing and displaying means, and for positioning the sensing and displaying means with respect to an orientation, said rail means including a rail with a hollow I-shaped cross-section; and wherein
said rail has first and second ends and an interconnector which is connected to both the first end and the second end in such a manner that the first end is spaced from the second end; and
said first end has defined therein a V-groove with first and second sides, said first end having first and second curves extending respectively from the first and second sides, toward the direction of the interconnector.

4. The inclinometer of claim 3 wherein:
said V-groove is located opposite to the interconnector and said first and second curves meet with third and fourth sides of the first end, which third and fourth sides also meet the interconnector.

5. An inclinometer comprising:

means for sensing and displaying an orientation with respect to a reference;

rail means for providing a mount for the sensing and displaying means, and for positioning the sensing and displaying means with respect to an orientation, said rail means including a rail with a hollow I-shaped cross-section;

said I-shaped cross-section having a first end which defines first and second curved lobes which meet to form a V-groove, which V-groove extends along the rail in a direction substantially perpendicular to the I-shaped cross-section; and said rail comprising an extrusion.

6. An inclinometer comprising:

a sensor means for sensing an orientation with respect to a reference;

a circuit means for communicating with the sensor means and for determining the orientation sensed by the sensing means;

a display means for communication with the circuit means and for displaying a visual representation of the orientation determined by the circuit means; and rail means for providing a mount for the sensor means, and for positioning the sensor means when an orientation is to be sensed, said rail means including a rail with a hollow I-shaped cross-section; and wherein said I-shaped cross-section has a first end which defines first and second curved lobes which meet to form a V-groove.

7. The inclinometer of claim 6 wherein:

said I-shaped cross-section has a first end which defines first and second curved lobes which meet to form a V-groove, which V-groove extends along the rail in a direction substantially perpendicular to the I-shaped cross-section.

8. An inclinometer comprising:

means for sensing and displaying an orientation with respect to a reference;

rail means for providing a mount for the sensing and displaying means, and for positioning the sensing and displaying means with respect to an orientation, said rail means including a rail with a hollow I-shaped cross-section; and wherein said I-shaped cross-section has a first end which defines first and second curved lobes which meet to form a V-groove.

9. An inclinometer comprising:

means for sensing and displaying an orientation with respect to a reference;

rail means for providing a mount for the sensing and displaying means, and for positioning the sensing and displaying means with respect to an orientation, said rail means including a rail with a hollow I-shaped cross-section; and wherein said I-shaped cross-section has a first end which defines first and second curved lobes which meet to form a V-groove, which V-groove extends along the rail in a direction substantially perpendicular to the I-shaped cross-section.

* * * * *